United States Patent
MacMullin et al.

(10) Patent No.: US 10,732,014 B2
(45) Date of Patent: Aug. 4, 2020

(54) EMISSION QUANTIFICATION USING A LINE SCAN OF GAS CONCENTRATION DATA

(71) Applicant: Picarro, Inc., Santa Clara, CA (US)

(72) Inventors: Sean Patrick MacMullin, Livermore, CA (US); Chris W. Rella, Sunnyvale, CA (US)

(73) Assignee: Picarro, Inc., Santa Clara, CA (US)

( * ) Notice: Subject to any disclaimer, the term of this patent is extended or adjusted under 35 U.S.C. 154(b) by 612 days.

(21) Appl. No.: 15/385,233

(22) Filed: Dec. 20, 2016

(65) Prior Publication Data

US 2018/0172544 A1  Jun. 21, 2018

(51) Int. Cl.
*G01M 3/04* (2006.01)
*G01F 1/00* (2006.01)
*G01M 3/38* (2006.01)

(52) U.S. Cl.
CPC .............. *G01F 1/00* (2013.01); *G01M 3/38* (2013.01)

(58) Field of Classification Search
CPC .................................. G01F 1/00; G01M 3/38
See application file for complete search history.

(56) References Cited

U.S. PATENT DOCUMENTS

| | | | |
|---|---|---|---|
| 4,135,092 A | 1/1979 | Milly | |
| 7,375,814 B2 | 5/2008 | Reichardt et al. | |
| 7,704,746 B1* | 4/2010 | White | E21B 41/0064 436/56 |
| 2010/0131207 A1* | 5/2010 | Lippert | G01S 17/58 702/24 |
| 2014/0032160 A1 | 1/2014 | Rella et al. | |
| 2015/0047416 A1* | 2/2015 | Rella | G01N 33/0031 73/30.01 |
| 2015/0059444 A1* | 3/2015 | Rella | G01N 33/0011 73/30.01 |

OTHER PUBLICATIONS

Reggente et al;The 3D-Kernel DM+V/W Algorithm: Using Wind Information in Three Dimensional Gas Distribution Modelling with a Mobile Robot; IEEE Sensors 2010 Conference; 2010. (Year: 2010).*

* cited by examiner

*Primary Examiner* — Regis J Betsch
*Assistant Examiner* — Jeremy A Delozier
(74) *Attorney, Agent, or Firm* — Lumen Patent Firm

(57) ABSTRACT

Flux estimates for gas plumes from gas leaks are obtained from a 1-D horizontal line scan of gas concentration measurements, combined with an estimate of the vertical extent of the gas plume. In this manner, flux estimates for gas plumes can be obtained without having to gather a 2-D image of gas concentration data.

11 Claims, 14 Drawing Sheets

EMISSION QUANTIFICATION USING A LINE SCAN OF GAS CONCENTRATION DATA

FIELD OF THE INVENTION

This invention relates to estimation of gas flux from gas leaks.

BACKGROUND

Methods for detecting gas leaks in ambient air have been investigated for many years. One of the basic problems of such measurements is to determine an estimate of the total gas leak rate from the leak source. A single point gas concentration measurement is not sufficient to determine the total gas leak rate. For example, a single measurement of a high gas concentration could mean the measurement point is very close to a relatively small leak, or some distance away from a large gas leak.

Accordingly, multi-point measurement techniques for gas leak detection have been investigated. U.S. Pat. No. 8,190,376 is a representative example. In this work, two or more gas concentration sensors are disposed in a region of interest, and these concentration measurements are combined with meteorological information (wind speed, direction and stability) to provide estimates of leak rate and leak location. A similar approach is considered in U.S. Pat. No. 6,772,071.

Although this approach can work well for leak detection in a fixed location, e.g., in a chemical plant, it is often necessary to perform leak detection from a mobile terrestrial platform such as a moving vehicle. One important application of mobile gas leak detection is detecting leaks in natural gas utility distribution systems. For mobile gas leak detection, it is not usually possible to have several gas concentration sensors disposed around the location of possible gas leaks, thereby making the above-described approach inapplicable.

Accordingly, it would be an advance in the art to provide improved gas leak measurements, especially from a mobile terrestrial platform.

SUMMARY

The present approach is based on the idea of obtaining a gas concentration image (i.e., concentration vs. position data) in a cross section through a gas plume. Such measurements can be obtained by using a 2D array of gas sample inlets, or by moving a 1D array of gas sample inlets through the gas plume. For example, the 1D array of gas sample inlets could be disposed on a mast affixed to a vehicle. By combining a gas concentration image with ambient flow information through the surface of the gas concentration image, the leak rate (i.e., gas flux) from the leak source can be estimated.

Gas samples are simultaneously acquired by filling gas sample storage chambers (one gas sample storage chamber for each of the gas sample inlets). This is the default operation mode, which is convenient to regard as recording mode. The other operating mode is a playback mode, where the gas samples in the gas sample storage chamber are sequentially provided to a gas analysis instrument. Triggering from the recording mode to the playback mode can be based on ancillary measurements (e.g., detection of an above baseline gas concentration).

In this manner, the expense of having one gas analysis instrument for each of the measurement points can be avoided. Another advantage of the present approach is that using a single analysis instrument means that cross-calibrating multiple analysis instruments is not required. An important feature of this approach is that it does not require sensors to be disposed around the location of a possible gas leak. Instead, measurements all from one side of the gas leak can suffice, provided the measurement points include a good cross section of the gas plume.

In some preferred embodiments, gas collection via line pixels can be used to compensate for vertical wind speed variation.

In a further elaboration of this basic idea, we have found that flux estimates can be obtained from 1-D gas concentration measurement data. The main idea is to supplement this 1-D data with an estimate of vertical plume extent.

Definitions

As used herein, a structure is "in proximity" to a line scan if the distance between the structure and the line scan is less than 5× the height of the structure. This is a rough scaling distance corresponding to the healing length of the wind in the presence of obstacles.

It is convenient to define a gas leak as being any situation where gas is present in the environment in above-background concentrations. Gas leaks as defined include, but are not limited to: leaks from gas pipes or transportation systems (e.g., natural gas leaks), leaks from gas processing or handling facilities, and emissions from gas sources into the environment (e.g., pollution, gas emission from landfills, etc.).

A gas plume model is any mathematical model that relates gas concentration to position in space.

DETAILED DESCRIPTION

Section A describes gas plume flux estimates from a 2-D array of gas concentration measurements. Section B provides further details relating to horizontal spatial scale analysis for automatic determination of whether or not a gas leak is present. Section C describes gas plume flux estimates from a 1-D array of gas concentration measurements.

A) Gas Plume Flux Estimates from a 2-D Array of Gas Concentration Measurements.

Figure 1A:
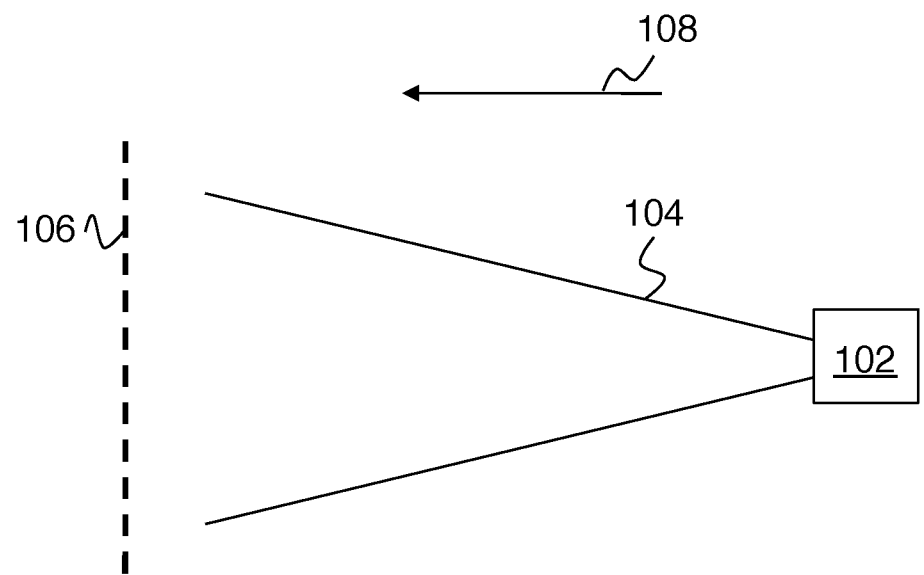
FIG. 1A shows a side view of a gas plume.
Figure 1B:
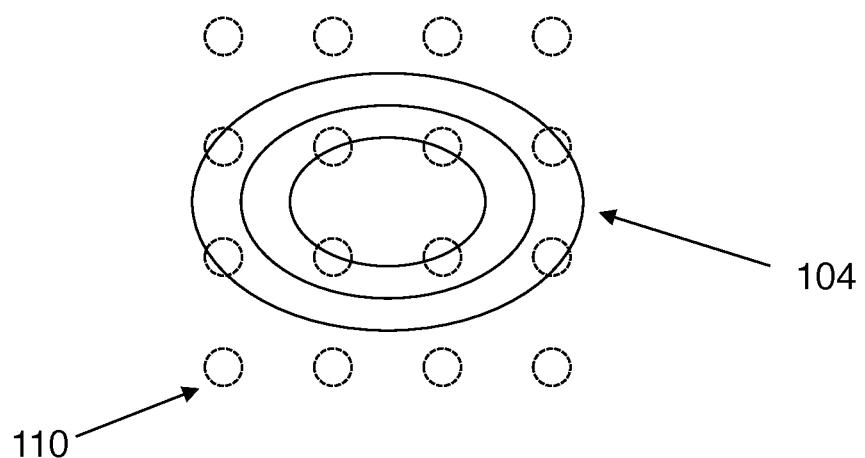
FIG. 1B shows an end view of the gas plume of FIG. 1A.

FIG. 1A shows a side view of a gas plume. FIG. 1B shows an end view of the gas plume of FIG. 1A. Here 102 is a source of a gas leak, which leads to a gas plume 104 as driven by an ambient wind 108. A smooth vertical surface 106 intersects the gas plume 104. FIG. 1B shows a view in the plane of surface 106, where measurement points 110 (dotted lines) overlap with the plume 106.

Consider a planar (or other) surface, through which one wants to measure the flux of molecules. The flux of molecules through the plane is given by the following integral:

$$Q(t) = \int_A k(C(x, y, t) - C_0)\vec{u}(x, y, t) \cdot \hat{n} \, dA \quad (1)$$

where $C(x,y,t)$ is the concentration at a given point in space on the surface A at time t, $C_0$ is the background concentration of the target gas in the ambient, $\vec{u}(x,y,t)$ is the velocity of the gas through the surface, and $\hat{n}$ is the normal to the surface element dA. The constant k converts volumetric flow in $m^3/s$ to moles/s, such that the units of emission $Q(t)$ are, for example, moles/second. In this manner, gas concentration image measurements can be related to the total emission $Q(t)$ from the leak source.

As indicated above, and described in greater detail below, gas samples are acquired simultaneously into two or more gas sample storage chambers, and then provided sequentially to a gas analysis instrument. Thus an exemplary method includes the following steps:

1) simultaneously collecting two or more gas samples in two or more gas sample storage chambers, where the gas sample storage chambers receive input gas from two or more measurement locations, and where the measurement locations are configured to be on a smooth vertical surface;
2) providing the two or more gas samples sequentially to a gas analysis instrument to provide gas concentration data points;
3) relating the gas concentration data points to the two or more measurement locations to provide a gas concentration image of the smooth vertical surface; and
4) providing the gas concentration image as an output.

Optionally, the further steps of: 5) obtaining an estimate of ambient flow velocity through the smooth vertical surface; and 6) computing a gas flux estimate from the gas concentration image and the estimate of ambient flow velocity can be performed. The flow velocity estimate can be a single speed and direction estimate, or it can account for variation in speed and/or direction as a function of height above ground. When a height-dependent wind speed is used, the functional form of the wind speed vs. height can be either a fixed functional form, or a form based upon real-time conditions, such as wind speed, solar radiation, terrain, or other atmospheric conditions.

Figure 2:
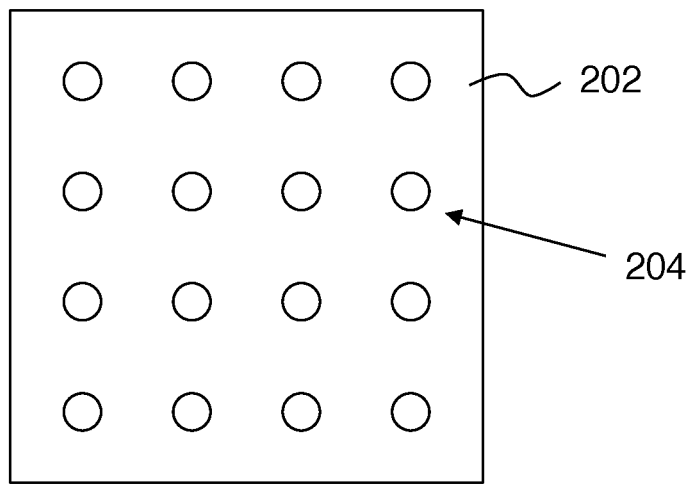
FIG. 2 shows an exemplary 2D array of gas sample inlets.

The measurement locations for gas concentration images can be defined in various ways. One way is to have a 2D array of measurement ports corresponding to the measurement locations. FIG. 2 shows an exemplary 2D array of measurement ports. In this example, an array of measurement ports 204 is provided in member 202 to define the measurement locations. Such an array could be used as a fixed installation, or it could be disposed on a vehicle.

Figure 3:
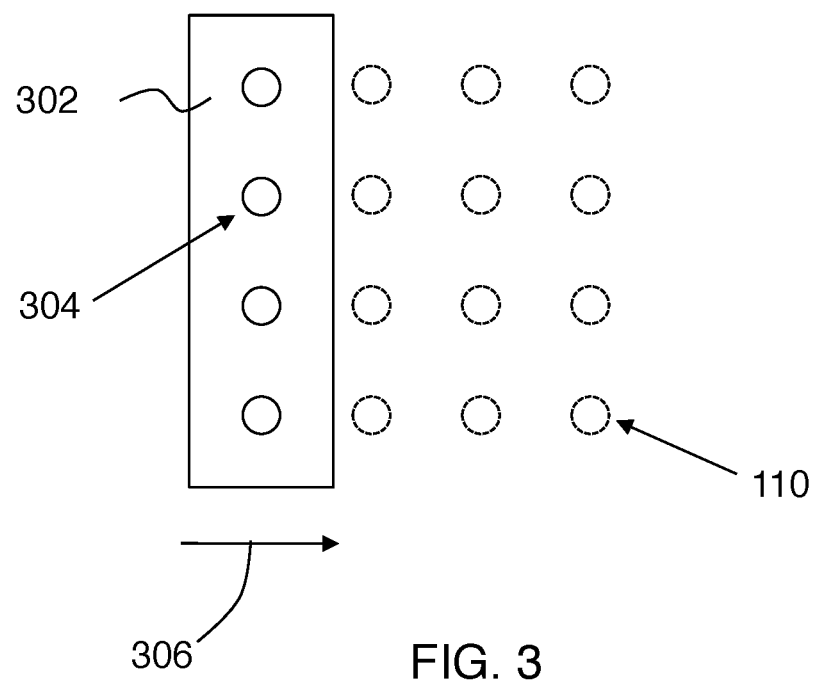
FIG. 3 shows an exemplary 1D array of gas sample inlets configured to be movable through a gas plume.

Another approach for defining the measurement locations is to have a 1D array of measurement ports that can be moved through gas plumes to measure them. FIG. 3 shows an exemplary 1D array of measurement ports configured to be movable through a gas plume. In this example, an array of measurement ports 304 is provided in member 302 to define the measurement locations. As member 302 moves as indicated by arrow 306, a 2D array of measurement locations 110 is defined. For simplicity, FIG. 3 shows a discrete 2D array of measurement locations. It is also possible for the gas samples taken via inlets 304 to be measured continuously, in which case the resulting gas concentration image is still 2-dimensional, but the measurement locations are a set of lines instead of discrete points. This approach is considered in the example of FIGS. 7-9. The resulting gas concentration image is a snapshot in time, to the extent that the transit time of member 302 through the plume is substantially faster than the evolution of the plume in time. Possible evolution of the plume during transit of the vehicle through the plume can lead to over- or under-estimates of the emissions.

In general, the measurement locations can be an array (either Cartesian or non-regular spacing) of ambient air measurement points, distributed on a surface substantially orthogonal to the wind direction. A measurement point can be anything that defines the location of the gas being sampled in a point, line and/or area, such as an inlet of a tube (point), tubes with slots in the side walls (line), and general apertures (area).

When a 1-D array of measurement ports is used to determine a gas concentration image, it is important for the gas concentration measurements to include time information, and to relate the measurement times to measurement positions.

Figure 4A:
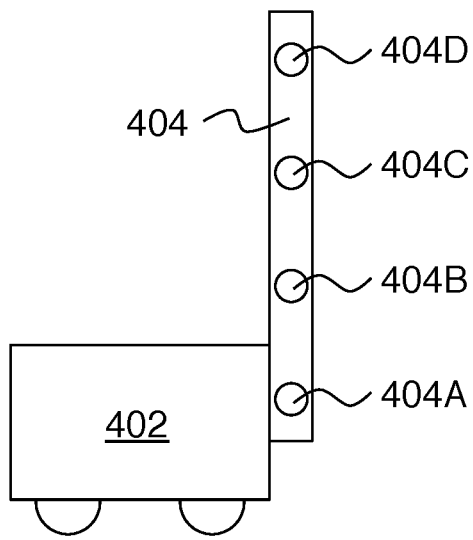
FIGS. 4A-C show examples of 1D arrays of gas sample inlets mounted on a vehicle.

One approach for providing a 1D array of measurement ports that can readily move through a gas plume is to affix a mast to a vehicle. FIG. 4A shows an example, where mast 404 is affixed to vehicle 402. Mast 404 includes measurement ports 404A, 404B, 404C and 404D. This example shows four measurement ports. In general, two or more measurement ports can be employed. The measurement locations are defined by the 1-D array of measurement ports disposed on mast 404 that sweep out a 2-D array of measurement points (discrete points, or a set of continuous lines) as the vehicle moves.

Figure 4B:
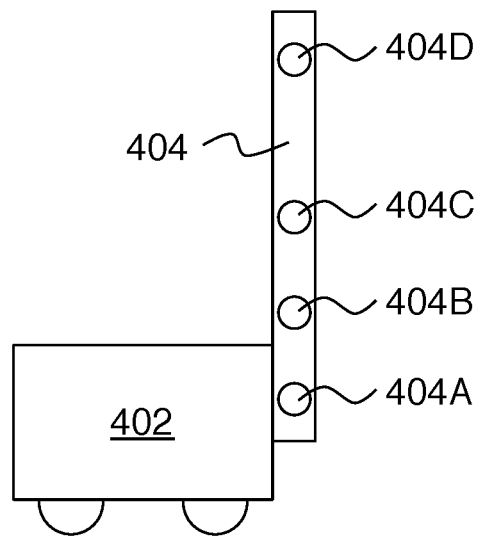

Optionally, the locations of the measurement ports on the mast can be altered during operation and/or adjusted between measurement runs. FIG. 4B shows an example, where the measurement ports on FIG. 4B are in different locations than in the example of FIG. 4A. Optionally, the arrangement of the measurement ports could be changed using a servo system to toggle between two or more predetermined measurement port configurations, or to a configuration where one or more of the measurement ports moves dynamically during the measurement. Optionally, the configuration of measurement ports can include vertically separated measurement ports and one or more additional low-height measurement ports near ground level that can be used specifically to identify on-road below-the-vehicle leaks that are not sufficiently offset from the vehicles axis of motion. It is useful to identify below-the-vehicle leaks, because a leak that is too close to the vehicle's axis of motion will lead to a plume that is not well-formed by the time it is intercepted by the vertical array of measurement points, and the emission rate measurement may be unreliable. The near ground vertical concentration gradient can be used to identify below-vehicle leaks. The near ground horizontal (transverse to the vehicle motion) gradient can also be used to identify below-vehicle leaks.

Figure 4C:
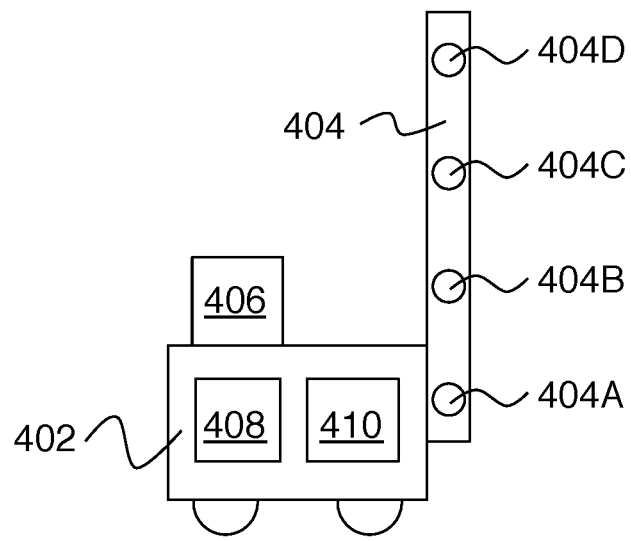

Optionally, further instrumentation can be included on the vehicle 402. FIG. 4C shows an example, where 406 is an instrument for measuring ambient flow velocity, 408 is a global positioning system (GPS) receiver to track horizontal position of the vehicle, and 410 is a vehicle speed sensor and a subsystem for converting time and vehicle speed information to position information. Ambient flow instrument 406 can include a system to relate on-board wind speed and direction measurements to ambient wind speed and direction by accounting for vehicle speed and direction. The on-board wind velocity (i.e., speed and direction) is the vector sum of the ambient wind velocity and the vehicle velocity. It is also possible to include any subset of ambient flow instrument 406, GPS 408 and vehicle speed sensor and subsystem 410. Wind speed and direction can also be obtained from a nearby fixed instrument (e.g., from publicly available weather information). More generally, wind speed, time of day, solar radiation, atmospheric turbulence, or other atmospheric measurements either on the vehicle or nearby can be used to further improve measurement accuracy.

Optionally, two or more masts (each having their own 1D array of measurement ports) can be disposed at the front of the vehicle and separated along the transverse horizontal axis (i.e., along the vehicle width). The recorded gas can be analyzed sequentially using the single analysis instrument, or in parallel with one or more additional analysis instruments. The measurements from each of the masts provide additional measurements of the plume, which can be especially helpful for leaks which are very close to the axis of motion of the vehicle—the plume for the more distant mast may be larger and better formed.

Figure 5:
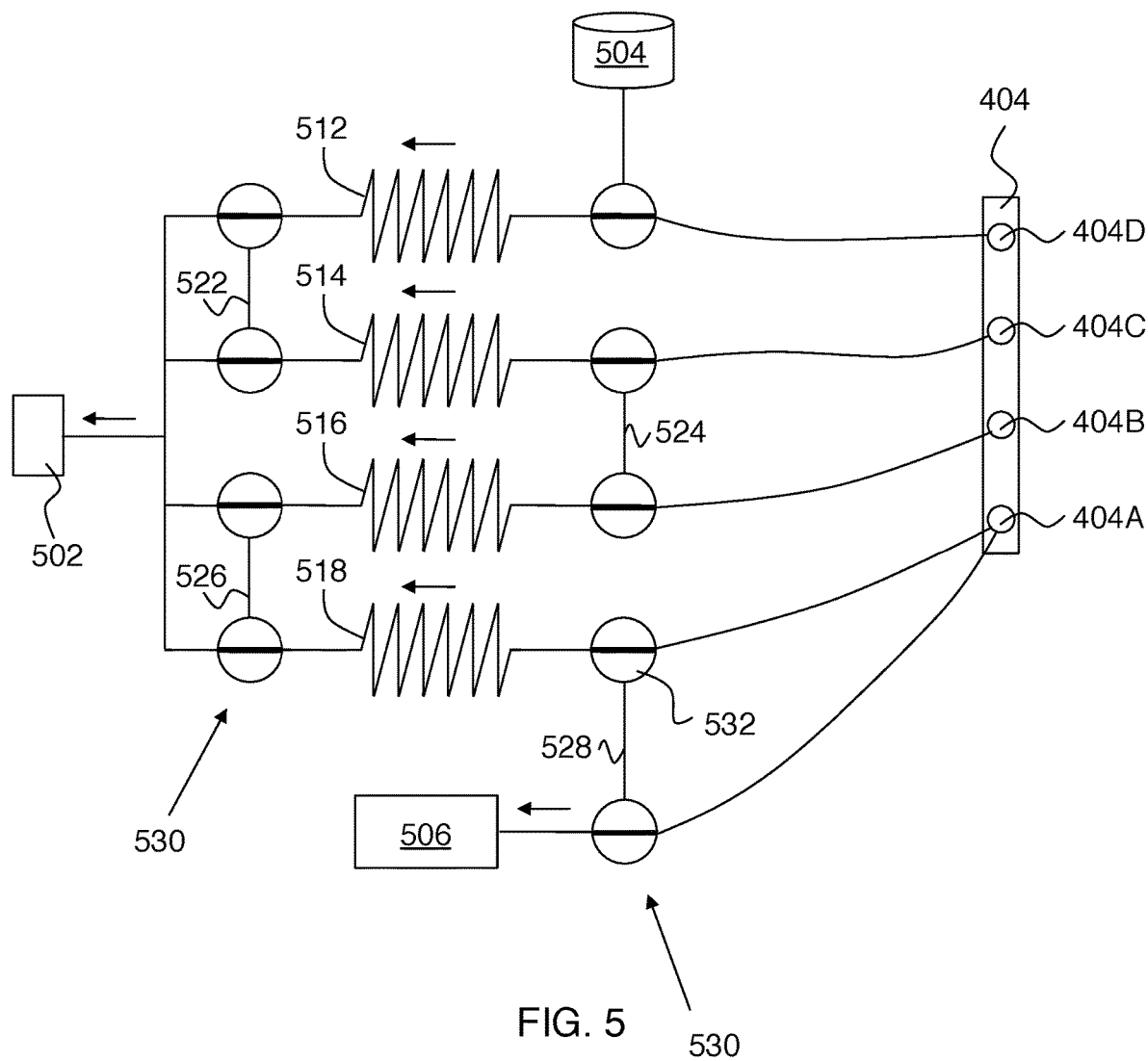
FIG. 5 shows recording mode of an exemplary embodiment of the invention.
Figure 6:
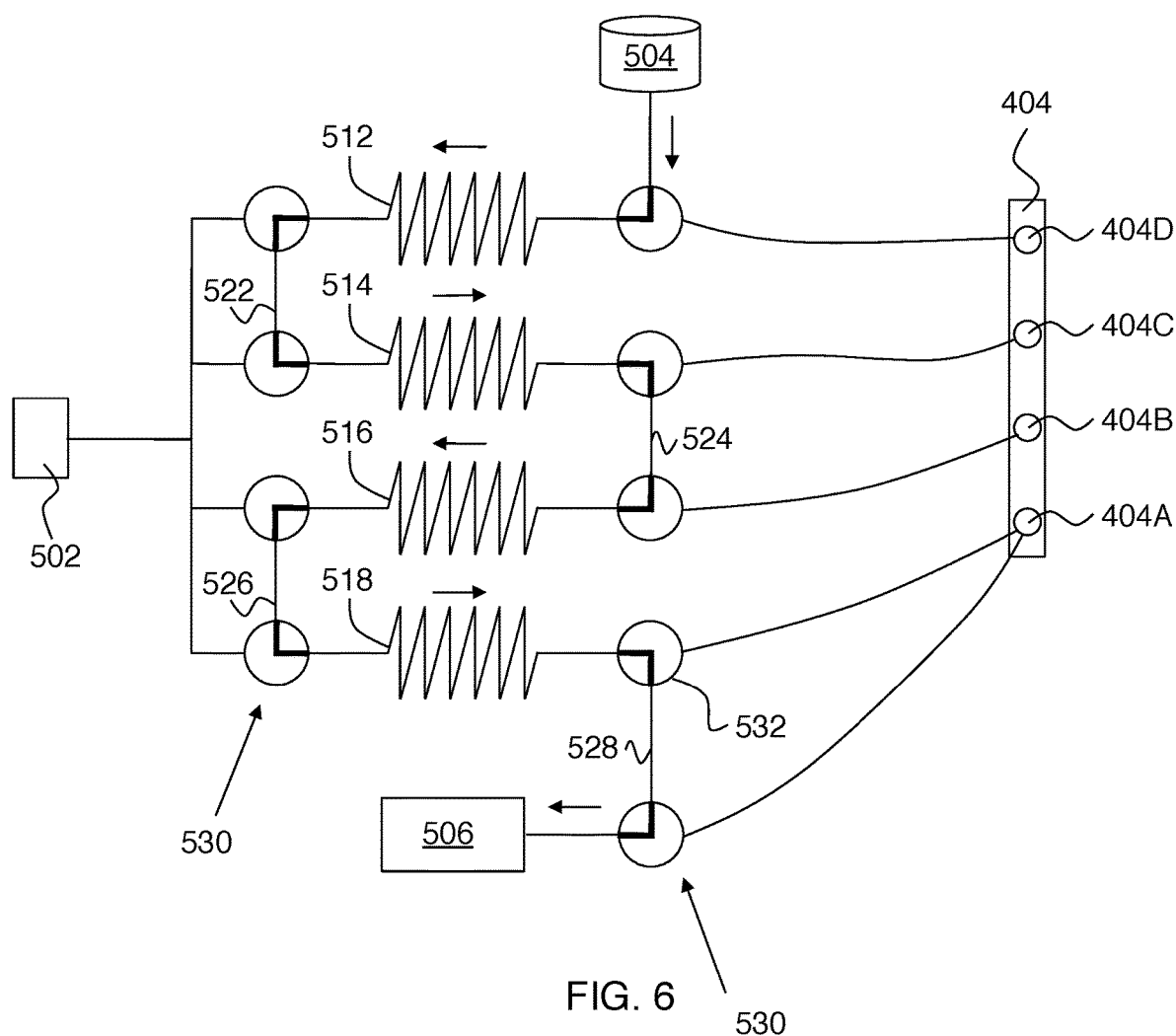
FIG. 6 shows playback mode of an exemplary embodiment of the invention.

FIGS. 5 and 6 show an exemplary embodiment of the invention in recording mode (FIG. 5) and playback mode (FIG. 6). In this example, mast 404 includes measurement ports 404A, 404B, 404C, and 404D. In recording mode (FIG. 5), pump 502 simultaneously draws gas samples from measurement ports 404A, 404B, 404C, and 404D into gas sample storage chambers 518, 516, 514, and 512, respectively. Gas flow control manifold 530 (which includes nine three-way valves, one of which is referenced as 532) is configured to allow this flow, as shown by the heavy lines in the three way valves. Mast 404 is affixed to a vehicle, so the measurement locations defined by the measurement ports are on a smooth vertical surface.

A gas analysis instrument 506 is included, and it receives gas from one of the measurement ports (404A in this example). Any kind of gas analysis instrument can be used. Preferred instruments include cavity enhanced optical spectroscopy instruments, such as cavity ring down spectroscopy (CRDS) instruments and cavity enhanced absorption spectroscopy (CEAS) instruments. In recording mode, gas analysis instrument 506 is mainly used to trigger the switch into playback mode. Any suitable way to trigger playback mode can be used, and practice of the invention does not depend critically on these details (e.g., which of the measurement ports instrument 506 is connected to in recording mode). Optionally, instrument 506 can be used to measure one or more of the measurement ports in real time during the recording phase to ensure that the measurement surface is substantially downwind of the source of emissions.

In playback mode (FIG. 6) the gas flow control manifold 530 is configured to provide the two or more gas samples sequentially to the gas analysis instrument to provide gas concentration data points. This is shown by the heavy lines in the three way valves on FIG. 6.

The system is configured to relate the gas concentration data points to the two or more measurement locations to provide a gas concentration image of the smooth vertical surface, as described above.

More generally, outputs from this measurement can include one or more of the following: 1) An estimate of the emissions transported by the wind through the surface defined by the measurement points, either averaged over the time period of the measurement, or reported with the time resolution of the device, determined by a) the response time of the instrument, b) the ratio of flows between recording and playback, and c) time dispersion of gas in the tubes during recording and playback; 2) An image of the concentration measured on the surface, averaged over the time period of the measurement; or 3) A video of the concentration measured on the surface, as it evolved during the time period of the measurement.

The number of gas sample storage chambers is limited only by the number of 3-way valves (two are needed per gas sample storage chamber), the speed of the analysis instrument, the desired duty factor of the measurement, and the potential for pulse spreading within the tubing (which is negligible for most practical situations). Pulse spreading is likely to be most serious during high flow rate playback.

Preferably, the gas sample storage chambers are configured as tubes having a length to diameter ratio of 20:1 or more (more preferably 100:1 or more). This high aspect ratio usefully provides a time axis for gas samples in the gas sample storage chambers. Further details on this concept of preserving a time axis in gas samples in narrow tubes are given in U.S. Pat. No. 7,597,014, filed Aug. 15, 2006, and hereby incorporated by reference in its entirety.

Optionally, plumbing manifold 530 can include volumetric or mass flow sensors located on each of the recording lines and/or the analysis line, so that accurate time reconstruction is possible given the valve switching times and the molar volumes contained in the gas manifold and connection tubing. This can make the system more robust to unexpected conditions (pressures, flow conductivity, etc.) in the plumbing system.

For time efficiency, the flow rate through the gas analysis instrument during playback mode is preferably larger than the flow rate through the gas sample storage chambers during recording mode. Precise flow sensing or control can be used to maintain the integrity of the time axis for the several gas samples, and to make sure that all of the gas sample storage chambers are filled with gas that corresponds to the same period of time.

It is preferred for the system to include a push gas source 504, as shown on FIGS. 5 and 6. Provision of a predetermined push gas during playback, as opposed to just allowing ambient in during playback can provide significant advantages. The most important advantage is the ability to use the push gas to identify the transitions between the various gas samples being analyzed in playback mode. This can be accomplished by having the push gas separate the gas samples when they are provided to the gas analysis instrument 506. For example, trapped push gas in tubing 522, 524, 526 and 528 can provide such separation. Push gas can be trapped in these sections of tubing by performing a complete playback of all gas samples until push gas is the only gas present in the system. After that, switching to recording mode (FIG. 5) will trap push gas in tubing 522, 524, 526 and 528. The push gas is preferably distinguishable from the gas samples using results from the gas analysis instrument.

The push gas can be distinguished from the gas samples by having a different concentration of the primary gas (i.e., the gas which is being measured in ambient) than is possible in the gas samples and/or by including a secondary gas species which the gas analysis instrument is responsive to and which is not expected to occur in the gas samples. The optional use of a secondary gas species in the push gas can avoid disrupting the primary measurement by changing concentration of the primary species in the push gas.

Optionally, the push gas concentration can be below ambient concentration levels, so that this low signal is unique to the push gas and will not exist under reasonable conditions in the recorded ambient gas, thus giving a clear signature for identification of the timing pulses provided by the push gas. Optionally, zero air (i.e., ambient air filtered to contain less than 0.1 ppm total hydrocarbons) can be the push gas, or zero air can be used to dilute ambient air to provide the push gas. Optionally, the component of the push gas used to provide the timing information can be $CO_2$. Optionally, the push gas can be ambient air that is subsequently treated by a soda lime, ascarite, or other $CO_2$ trap to reduce the $CO_2$ concentration below ambient levels.

Optionally, the push gas concentration can be above ambient concentration levels. Optionally, a high concentration of the push gas species can be contained in a semipermeable container, such as a section of PTFE (polytetrafluoroethylene) tubing, such that slow diffusion of the gas from the container into a sample of ambient air provides the push gas for timing measurement.

The example of FIGS. 5 and 6 shows providing the two or more gas samples sequentially to the gas analysis instrument by connecting the gas sample storage chambers to each other in series and flowing the gas samples to the gas analysis instrument. Alternatively, the two or more gas samples can be provided sequentially to the gas analysis instrument by sequentially switching the gas sample storage chambers to flow to the gas analysis instrument (e.g., with an N-way valve for N gas sample storage chambers). As another alternative, banks of measurement ports can be measured serially, with different banks being selected by a multi-position valve at the inlet of instrument 506. Such use of banks of measurement ports can mitigate the gas dispersion in the gas sample storage chambers, because the sample in the last gas sample storage chamber (e.g., 512 on FIG. 6) does not need to be transported through all the other gas sample storage chambers before it reaches the measurement instrument.

Figure 7:
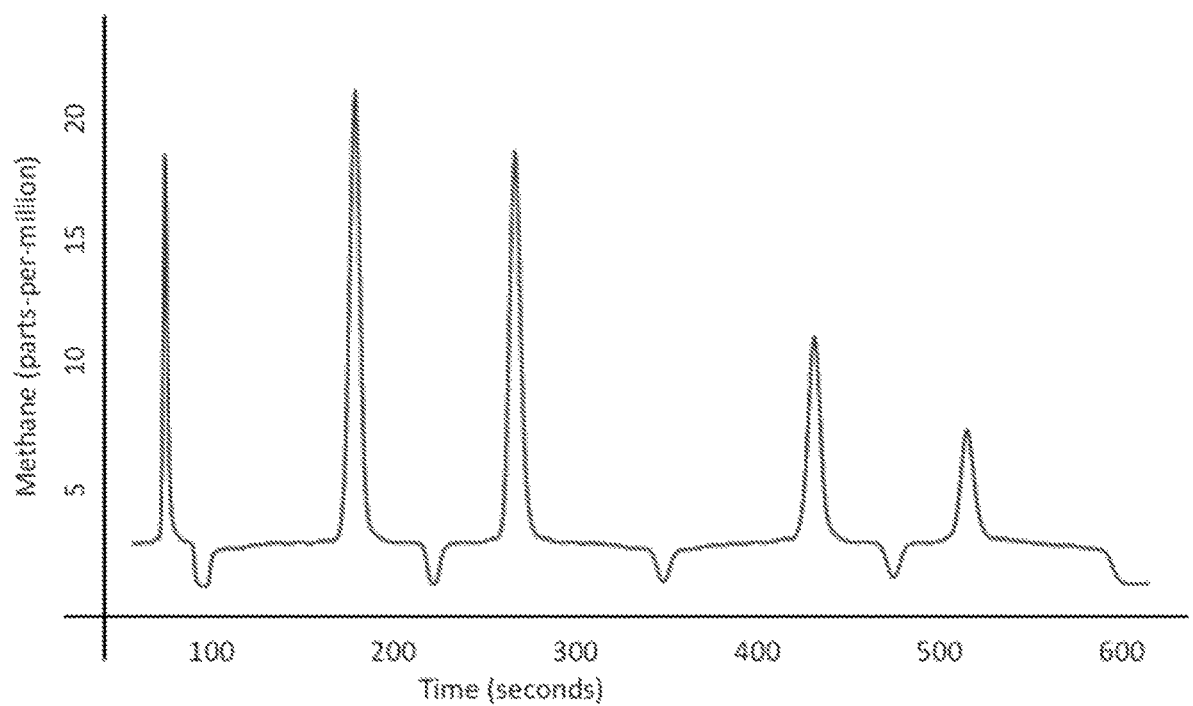
FIG. 7 shows an exemplary playback signal.
Figure 8:
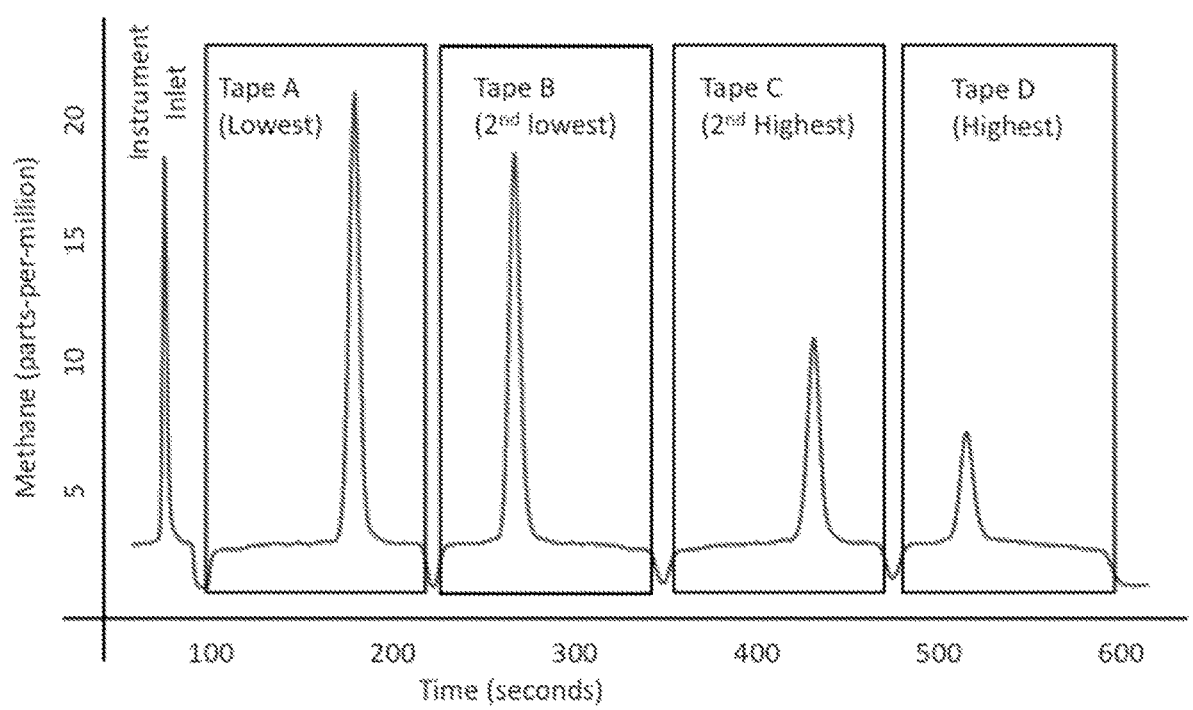
FIG. 8 shows how the various parts of the signal of FIG. 7 are related to the gas sample inlet ports.
Figure 9:
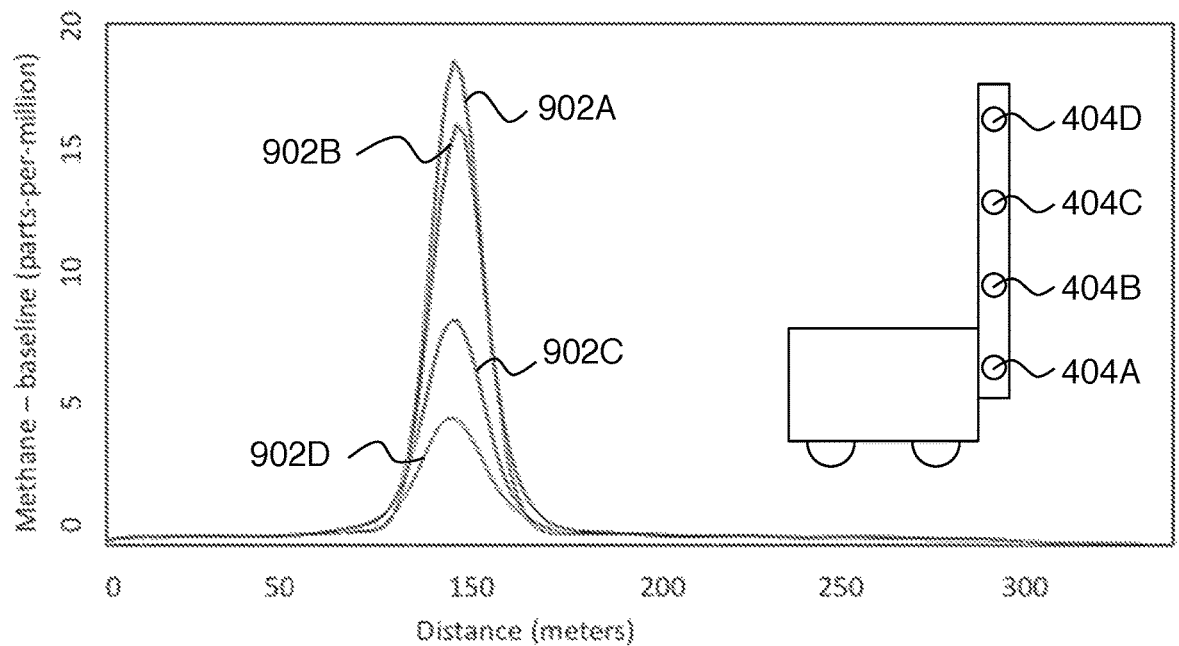
FIG. 9 shows the results of FIGS. 7 and 8 related to a common horizontal position axis.

Important features of the present approach can be better appreciated by considering the data of FIGS. 7-9. FIG. 7 shows a playback signal from a 4-channel system as in FIGS. 5 and 6. In this exemplary system, gas sample storage chambers 512, 514, 516, and 518 have capacity 500 scc (standard cubic centimeter), and the recording flow rate is 1000 sccm (standard cubic centimeters per minute). Thus, the gas sample storage chambers each provide 30 seconds of stored gas sample. FIG. 8 shows how the various parts of the signal of FIG. 7 are related to the gas sample inlet ports. Here Tape A relates to measurement port 404A, Tape B relates to 404B, etc. The dips in the measured concentration are from trapped push gas that separates the samples. Here it is clear that the time axis for Tape B is reversed relative to the time axis for Tape A, which is consistent with the opposite flow directions through gas sample storage chambers 516 and 518 shown on FIG. 6. Similarly, the time axis of Tape D is reversed with respect to Tape C, while Tape A and Tape C have consistent time axes. All of this is consistent with the flow directions through gas sample storage chambers 512, 514, 516, and 518 on FIG. 6.

FIG. 9 shows the results of FIGS. 7 and 8 where time has been converted to position, thereby relating the four gas samples to a common horizontal position axis. This information can be used to provide a 2D gas concentration image for the plume, which in this example gave a source flux estimate of 1.5±0.3 L/s based on a wind speed estimate of 2.5 m/s (normal to the measurement surface) and a vehicle speed of 10.8 m/s.

In some cases, it is preferred to account for wind speed, especially the variation of wind speed with height. If the wind speed does not vary with vertical position, the following simplification can be made to Equation 1:

$$Q(t) = \int_A k(C(x, y, t) - C_0)\overrightarrow{u(x, y, t)} \cdot \hat{n}\, dA \qquad (2)$$
$$= \int_D kH(\Gamma(x, t) - C_0)\overrightarrow{u(x, t)} \cdot \hat{n}\, dx$$

where $$\Gamma(x, t) = \frac{1}{H} \int^H C(y)dy.$$

Figure 10A:
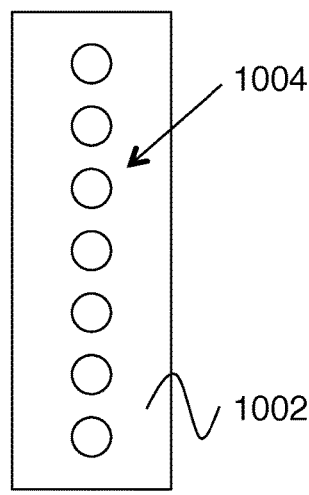
FIGS. 10A-C show exemplary line pixel configurations.

In other words, $\Gamma$ is the average concentration vertically. Measurement of the average vertical concentration could be accomplished with a 'line pixel' which responds by drawing a constant amount of gas per unit distance vertically that is analyzed with a single gas analyzer. One example of a line pixel is shown on FIG. 10A, where a section of tubing 1002 has identical holes 1004 drilled in the wall that are distributed evenly vertically. The flow through each hole is the same, thus leading to an even weighting of the concentration reported by an analyzer measuring the combined flow from all the individual holes.

However, under typical conditions, the wind field is not constant vertically. Various models have been used for wind speed vs. height. For example, one model is a power law with height of the following form:

$$u(y) = u_0 \left(\frac{y}{y_0}\right)^\alpha \qquad (3)$$

where $\alpha$ is typically 0.1 to 0.2. As can be seen, this is a fairly weak dependence on height, except very close to the ground, where the wind drops to zero as expected.

Another model for the wind profile is logarithmic:

$$\frac{u(y)}{u(y = y_0)} = \ln\left(\frac{y}{y_{surface}}\right) \Big/ \ln\left(\frac{y_0}{y_{surface}}\right) \qquad (4)$$

Here, $y_{surface}$ is a scaling parameter related to the roughness of the ground surface. For typical values of $y_{surface}$ of at most a few centimeters, this profile also has a weak dependence on height except near the ground, as with the power law form.

A line pixel with evenly spaced inlet points of equal flow (i.e., a 'balanced' line pixel as shown on FIG. 10A) can lead to biased results, depending upon where the centroid and extent of the plume intersects the balanced line pixel. For example, the flux of a plume that strikes the pixel close to the ground would be overestimated. Conversely, a plume that strikes the balanced line pixel high would be underestimated.

However, it is possible to create a line pixel where the vertical responsivity of the pixel is tailored to compensate for the vertical wind gradient. In other words, if a line pixel is constructed such that it responds with a weighted average concentration $$\Gamma_{weighted}(x, t) = \frac{1}{H} \int^H C(y)\left(\frac{y}{y_0}\right)^a dy,$$

then the emissions integral simplifies to $$Q(t) = \int_D kH(\Gamma_{weighted}(x,t) - C_0)\overrightarrow{u_0(x,t)} \cdot \hat{n} dx \quad (5)$$

Figure 10B:
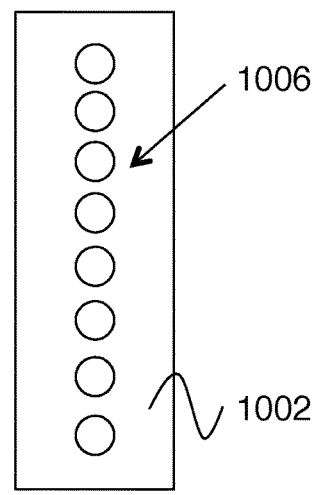
Figure 10C:
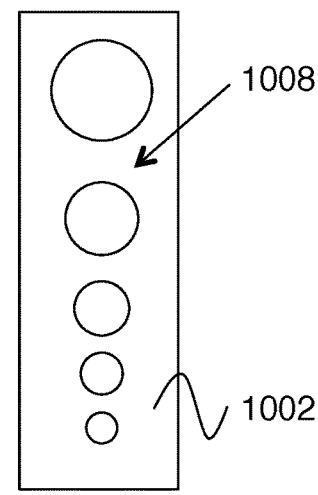

The weighting function is the same power law that determines the vertical wind speed gradient, and can be accomplished practically, for example, by drilling holes with the same diameter but with a higher density at higher elevations (e.g., holes 1006 on FIG. 10B), or with larger diameters at higher elevations (e.g., holes 1008 on FIG. 10C), such that the flow into the line pixel/unit height follows the same power law. Similar compensation can be done for the logarithmic model of Equation 4, or for any other wind speed model. Other means of achieving a tailored profile of flow/unit height are also possible, such as active flow control devices (e.g., proportional flow valves, pulse width modulated valves, or a spatially selective activation of vertically disposed on-off valves to achieve an effective flow/unit height); in addition, passive flow control devices downstream of the physical inlet (e.g., orifices, critical flow orifices, or long tubing lengths), alone or in combination, can be used with a wide range of inlet sizes to achieve the specified flow condition. The inlet flow rates of the various contributions to a line pixel can be altered in operation using active flow control devices.

The spatial density scale for which inlets can be effectively grouped for the purposes of determining flow/unit height is the typical size of a plume, which is 0.1-10 m under most practical conditions.

It is also a significant advantage if a plume presented simultaneously to all the inlet ports be delivered simultaneously when the flows are combined and the gas is brought to the analyzer. This allows the system to quantify the flux with high spatial resolution, which is a significant advantage when emissions sources are close together. The simplest form of array inlets, i.e., a tube perforated periodically or aperiodically by small holes, does not achieve this goal, since gas which enters at the far end of the perforated tube has a significantly longer transit time to the instrument than gas which enters at the near end of the tube. One way to accomplish this goal is to equalize the transit time of the tubing from each of the inlets to the instrument, where the transit time is given by the volume per unit length of the tubing divided by the volumetric flow of that inlet. The transit time is proportional to the tubing length for equal flow systems, but is inversely proportional to the flow of each inlet.

Figure 11:
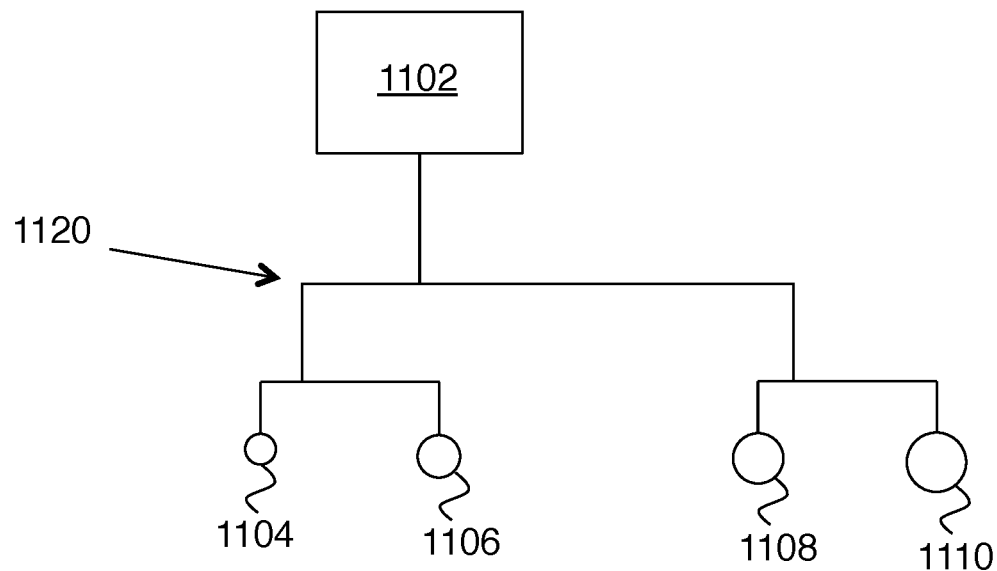
FIG. 11 shows an example of transit time equalization within a line pixel.

There are other, more efficient and practical configurations. In FIG. 11, the lengths of tubing 1120 are arranged such that the higher flow inlets have longer transit paths before they are combined into instrument 1102. For example, high-flow inlet 1110 has the longest transit path, low-flow inlet 1104 has the shortest transit path, and inlets 1106 and 1108 have intermediate length transit paths according to their respective flow rates. The tree-like arrangement of the branching makes for an efficient use of tubing. The example of FIG. 11 is a binary tree, but $3^{rd}$ and higher order trees are also possible.

Figure 12:
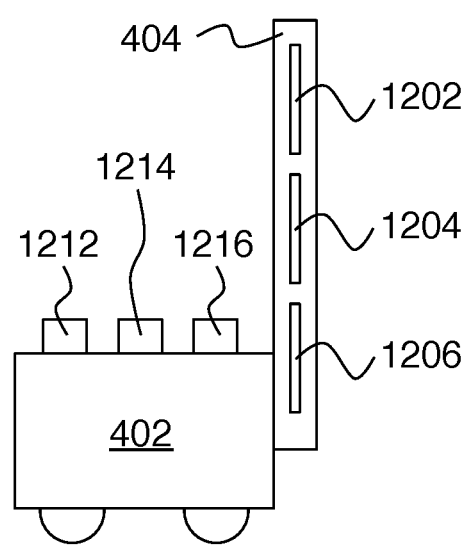
FIG. 12 shows an example of gas collection via multiple line pixels.

In some cases, where the plume flux is spread over a large range of vertical positions, it is advantageous to have two or more flow-weighted line pixels, situated each above the next, with separate analyzers measuring each. The flow into the inlets of each line pixel is arranged such that the vertical dependence of the integrand is removed for that line pixel, and the flux from each plane swept out by a line pixel is computed separately and summed. This has two advantages: first, it avoids the problem of encompassing a wide dynamic range of wind speeds with the same wide dynamic range of flows, and second, it increases the sensitivity of the system to plume structures close to the ground, where the advective wind flow is low but the concentration can be high. FIG. 12 schematically shows such a configuration, where mast 404 includes line pixels 1202, 1204 and 1206, each connected to a separate gas analysis instrument (1212, 1214, and 1216 respectively).

Line pixels as described here can be used as the measurement ports of any previously described embodiment. The resulting output need not be a gas concentration image. Instead, gas measurement results from line pixels can be useful for obtaining gas flux results from the measured data with reduced post-processing and/or fewer independent gas analysis instruments, which can expedite gas leak identification. In particular, such line pixels can aggregate nearby inlet locations to perform analog averaging of the concentration signals without the need to independently measure each location individually.

B) Horizontal Spatial Scale Analysis for Automatic Determination of Whether or not a Gas Leak is Present.

B1) Principles

Figure 13A:
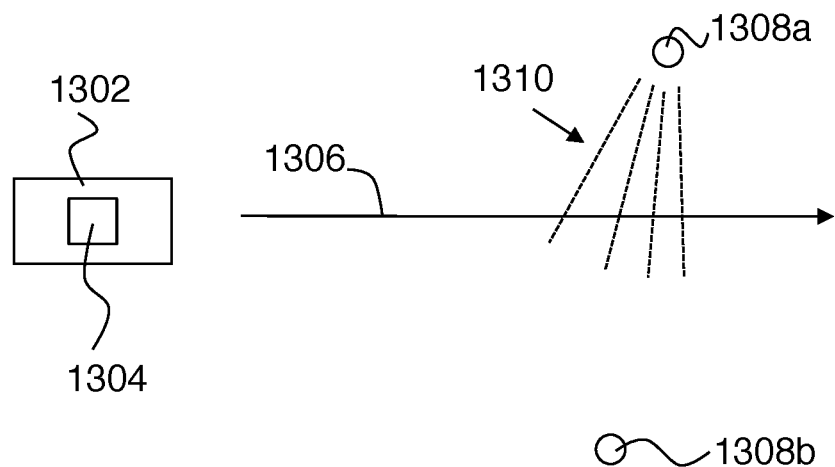
FIGS. 13A-B schematically show horizontal analysis according to principles of the invention.
Figure 13B:
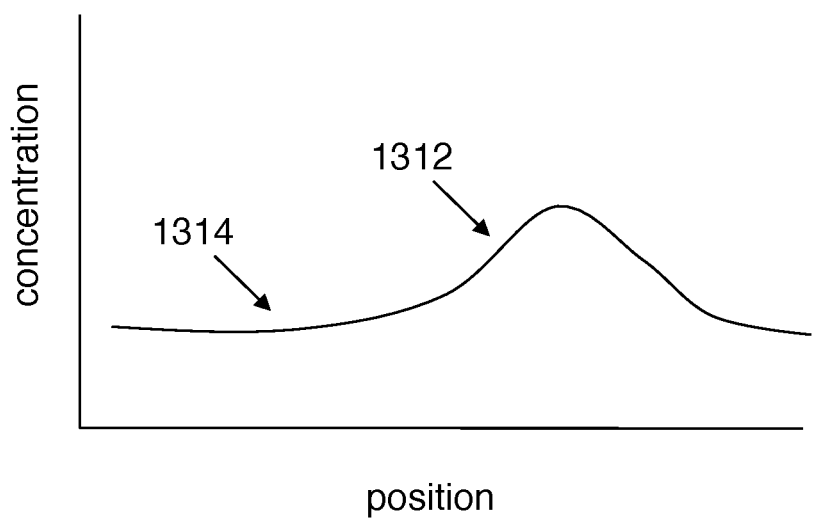

FIGS. 13A-B show an example of horizontal spatial scale analysis according to embodiments of the invention. A moving platform 1302 proceeds along at least one platform track 1306. Platform 1302 can be any vehicle, such as a car, truck, van, or bicycle. Platform 1302 can also be any other mobile entity capable of transporting the gas measurement instrument, such as a person, pack animal, etc. Platform track 1306 is disposed near one or more potential gas leak location (e.g., 1308a, 1308b). For simplicity, the platform track is shown as a single line segment, but in practice the platform track can be any combination of curves and line segments. In this example, a leak at location 1308a emits a gas plume 1310 that intersects platform track 1306. A gas measurement instrument 1304 is disposed on the platform. One or more primary gas concentration measurements are performed with instrument 1304.

Typically, these primary gas concentration measurements are originally recorded as concentration vs. time. Platform position vs. time data (e.g., using the Global Positioning System (GPS)) is combined with the concentration vs. time data to provide concentration vs. position data, schematically shown on FIG. 13B. Here a peak 1312 and a background level 1314 are shown.

The availability of concentration vs. position data enables automatic horizontal spatial scale analysis, which is useful for distinguishing gas leaks from background gas levels. In general, horizontal spatial scale analysis includes any analysis approach that makes use of concentration vs. platform position data for gas leak detection. A detailed example is given below. Note that simple thresholding (i.e., reporting a leak if measured concentration is greater than X, and not reporting a leak if the measured concentration is less than X, where X is some predetermined threshold value) is not an example of horizontal spatial scale analysis because no use is made of concentration vs. position data. Results of the automatic horizontal spatial scale analysis can be reported to an end user.

Horizontal Spatial Scale Analysis relies on the fact that nearby point sources vary rapidly with changing position as the platform moves, whereas distant sources vary more slowly, due to the larger spatial extent of the emission plume. In other words, narrow spikes in concentration just a few meters wide are generated very close to the platform. The narrow spatial extent is used to bias nearby sources in the leak identification process. There are several possible algorithms for performing horizontal spatial scale analysis, including but not limited to:

Peak finding and width analysis—the data can be analyzed using standard peak-location methods, and then each identified peak can be subsequently fit (using linear or nonlinear optimization) for center and width. The functional form used for this fitting step might be a Gaussian pulse (a Gaussian is the expected functional form taken by plumes propagating through the atmosphere), or the convolution of a Gaussian and the system response (which is typically a narrow Gaussian convolved with an exponential tail).

Spatial peak wavelet analysis—this algorithm uses a special model basis function (related to the discrete second derivative of the overall point-source system response function) that is parameterized by its width or spatial extent. This basis function set is convolved with the measurement data. The output wavelet analysis gives both the horizontal position and the effective width, which may be related via a gas plume model to the distance from the measurement to the emission source.

Preferably, the automatic horizontal spatial scale analysis is responsive to gas concentration peak full-widths (at half-maximum) in a detection range from about 2 m to about 100 m, and is substantially not responsive to gas concentration peak full-widths outside of the detection range. This spatial selectivity helps distinguish gas leaks from variations in background gas concentration. For example gas background concentration can vary significantly (e.g., by a factor of 2 or more), but this variation tends to be over a significantly larger spatial length scale than the above detection range. Note also that such large variations in background concentration significantly interfere with simple thresholding for finding gas leaks.

Primary gas concentration measurements are preferably performed rapidly (e.g., at a rate of 0.2 Hz or greater, more preferably 1 Hz or greater). This enables the concept of driving a vehicular platform at normal surface street speeds (e.g., 35 miles per hour) while accumulating useful concentration vs. position data. If the gas concentration measurements are too slow, spatial resolution of the data will undesirably be reduced. Preferably, platform position measurements are performed at least as rapidly as the primary gas concentration measurements.

Other significant attributes of the primary concentration measurement include:

1) The primary gas measurement analyte should be present in significant quantities for all leaks to be targeted by this method.

2) The typical background levels of this analyte in the environment where these measurements are made (e.g., urban) should be sufficiently low that the concentration change from the targeted leaks can be clearly distinguished from the local background signals at a distance of 10-300 meters.

3) For natural gas, methane is the most abundant constituent, but other hydrocarbons or other species (hydrogen sulfide or other odorants) are viable analytes for the primary concentration measurement.

Figure 14:
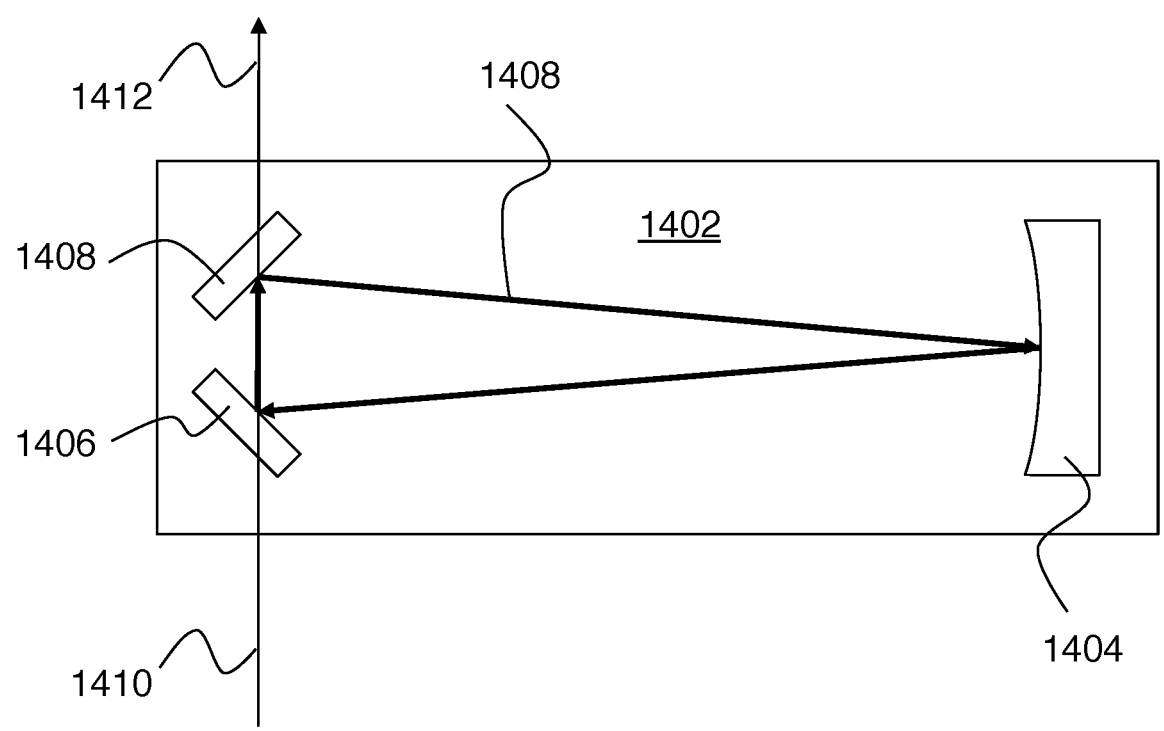
FIG. 14 schematically shows an exemplary optical absorption instrument suitable for use with embodiments of the invention.

The present invention does not depend critically on the gas detection technology employed. Any gas detection approach capable of providing rapid trace gas concentration measurements can be employed for the primary gas concentration measurements. One suitable gas detection approach is schematically shown on FIG. 14. Here the primary gas concentration measurements are optical absorption measurements made in a resonant optical cavity disposed in an instrument in the moving platform. More specifically, FIG. 14 shows an absorption cell 1402 capable of holding a gas sample for analysis. Absorption cell 1402 includes an optical cavity defined by mirrors 1404, 1406, and 1408. This example shows a ring cavity with a unidirectional cavity mode 1408 that propagates clockwise around the cavity. Any other resonant cavity geometry can be employed. Cavity absorption can be measured by comparing output light 1412 to input light 1410. Alternatively, cavity absorption can be measured by measuring the decay rate of optical radiation emitted from the cavity (i.e., cavity ring-down spectroscopy (ORDS)).

A2) Example

This section give a specific example of horizontal spatial scale analysis in connection with methane gas leak detection.

The methane concentration is measured initially as a function of time. It is combined with the output of the GPS receiver in order to obtain the methane concentration as a function of distance from some initial point. Interpolation can be used to sample the data on a regularly spaced collection of points.

The concentration of methane typically varies smoothly with position, for the most part being equal to the worldwide background level of 1.8 parts per million together with enhancements from large and relatively distant sources such as landfills and marshes. These enhancements can raise the background level by several parts per million. By contrast, a typical natural gas leak produces a plume of methane which is quite narrow in spatial extent. Although it varies with the atmospheric stability conditions, it is not until the plume has propagated more than 100 m that its half-width is of order 20 m in size.

The problem of detecting a gas leak by the spatial profile of the measured methane concentration thus involves:

1) Being insensitive to large-scale structure, which may be attributed to the background variations.

2) Detecting local enhancements in the methane concentration above the background consisting of peaks with half-widths in the approximate range of 1 m to 20 m.

3) Rejecting noise in the measurement due to instrumental imperfections.

The basic idea of this exemplary approach is to convolve the input concentration as a function of distance f(x) with a collection of Gaussian kernels $$g(x,w) = \exp(-x^2/2w)/\sqrt{2\pi w} \quad (6)$$

for a variety of scales specified by the parameter w (here w has dimensions of length squared). If we define L (x,w) to be the convolution of f(x) and g(x,w), the normalized second derivative $-w(\partial^2 L/\partial x^2)$ is sensitive to structures in f of spatial extent proportional to $\sqrt{w}$. For example, if f(x) is a Gaussian peak of half-width σ, i.e., $f(x)=\exp(-x^2/2\sigma^2)/(\sigma\sqrt{2\pi})$, we find that $$-w\left(\frac{\partial^2 L}{\partial x^2}\right) = \frac{w}{\sqrt{2\pi}}\left[\frac{w+\sigma^2-x^2}{(w+\sigma^2)^{5/2}}\right]\exp\left[-\frac{x^2}{2(w+\sigma^2)}\right] \quad (7)$$

which has a maximum at x=0 and $w=2\sigma^2$. The value of the maximum is about 0.385 times the amplitude of the original peak in f. Away from the peak, this falls smoothly to zero.

The basis of the algorithm is to calculate the surface $-w(\partial^2 L/\partial x^2)$ and to examine the result for local maxima in both x and w. For each maximum $(\hat{x},\hat{w})$ the position $x_0$ and half-width $w_0$ of the corresponding peak are reported as $x_0=\hat{x}$ and $w_0=\sqrt{\hat{w}/2}$, and the peak amplitude is scaled from the value of the surface at the maximum. Only a range of w is considered, corresponding to a range of peak half-widths of typically 1 m to 20 m that correspond to plume dimensions seen in leak detection.

Several mathematical properties allow for the more convenient calculation of the above space-scale surface. Since the Gaussian kernels satisfy $$\partial g/\partial w = \frac{1}{2}\partial^2 g/\partial x^2,$$

it is possible to compute the surface as the convolution of $-2w(\partial g/\partial w)$ and the input function f(x). A finite number of values of w are used in practice, spaced geometrically, namely $w \in \{w_1, w_2, \ldots, w_n\}$ where $w_i = \lambda^{(i-1)}w_1$ for some $\lambda > 1$. The partial derivative of g with respect to w can also be approximated by a finite difference, and the convolutions computed as discrete summations.

It is possible to organize the computation of the space-scale surface in a pipelined manner, so that a stream of samples of f(x) is used as input. The convolutions can be evaluated lazily so that at any stage, only enough samples of the surface are produced as are needed to determine whether a point on the surface is a local maximum. Once that determination has taken place, samples which are no longer needed are discarded, so that the entire calculation can take place in near real time in a limited amount of memory.

Having obtained the locations, amplitudes and widths of candidate peaks, an additional filtering step can be applied which selects amplitudes above a certain threshold (or within a certain range). As described in greater detail in section D below, the remaining peaks can be displayed as leak indications, using icons whose sizes indicate the amplitude of the peak, and whose positions on a map indicate where along the path the peak was located.

C) Gas Plume Flux Estimates from a 1-D Array of Gas Concentration Measurements.

In the approach of section A, a 2-D array of gas concentration measurements is used to provide a flux estimate for the gas plume. We have found it is also possible to provide such a flux estimate using a 1-D array of gas concentration measurements. The basic idea is to measure a horizontal plume extent and combine it with an estimate of vertical plume extent to provide the flux estimate.

An exemplary method for estimating a gas plume flux of a gas leak includes the following steps:

1) Collecting a line scan of local gas concentration measurement data, where the line scan is defined by one or more measurement ports disposed on a mobile terrestrial platform as the mobile terrestrial platform moves;

2) Automatically determining whether or not a gas leak is present by horizontal spatial scale analysis of the line scan of local gas concentration measurement data (e.g., as in section B above);

3) Automatically determining a horizontal plume extent from the line scan of local gas concentration measurement data;

4) Automatically estimating a vertical plume extent;

5) Automatically estimating an ambient flow velocity of the line scan (e.g., by direct measurement of wind speed and direction data from a sensor mounted on the mobile terrestrial platform, or by obtaining weather station data);

6) Automatically estimating a gas plume flux using at least the horizontal plume extent, the vertical plume extent and the ambient flow velocity;

7) Providing the gas plume flux as an output.

Figure 15:
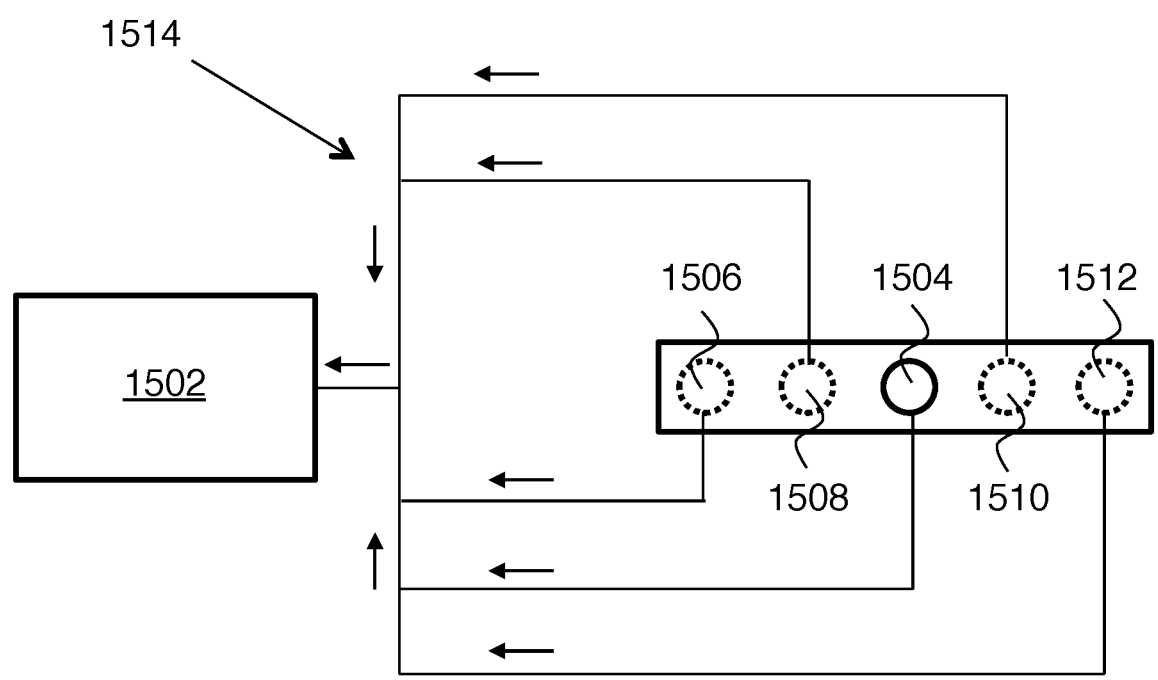
FIG. 15 shows a gas collection arrangement suitable for use in connection with providing gas flux estimates from a 1-D line scan of gas concentration data.

FIG. 15 shows an exemplary measurement port configuration for this approach. In one example, a single measurement port 1504 provides gas for analysis to instrument 1502 by way of manifold 1514. In preferred embodiments, several measurement ports are employed, such as optional ports 1506, 1508, 1510, and 1512 on FIG. 15. Gas from these ports is combined and provided to instrument 1502 by manifold 1514. In cases where such a 1-D array of measurement ports is employed, it is preferred for the 1-D array of ports to be substantially perpendicular to a direction of motion of the mobile terrestrial platform.

Arranging multiple horizontal gas ports will sample an average concentration in the transverse horizontal direction and can potentially detect upwind sources directly underneath the vehicle that may otherwise not be detected with a single sampling location. In this configuration, a smooth vertical surface that intersects the gas plume can be realized through a second "virtual sampling port" at height H.

In the definition of the average concentration (Equation 2), it is implied that in order to make an accurate measurement of gas plume flux, the gas plume must be completely captured by the measurements performed. The average concentration in Equation 2 may be written explicitly as $$\frac{H'}{H}\int^H C(x)dz$$

where H' is the vertical extent of the gas plume. It can be seen from this equation that the average concentration is independent of the height of the virtual sampling port and relies on the vertical extent of the plume. Here, it is assumed that the vertical concentration profile is flat and therefore the height of the physical sampling ports may be placed at any vertical height that transects the gas plume. In fact, a single transect is an instantaneous representation of a narrow plume that meanders from position to position (Hanna, S. R., Briggs, G. A., & Hosker, R. P. Jr. (1982). *Handbook on atmospheric diffusion*. United States doi:10.2172/5591108, hereby incorporated by reference in its entirety). In the case where the meandering effect is much larger than diffusion, the time-averaged concentration is approximately independent of the height.

Figure 16:
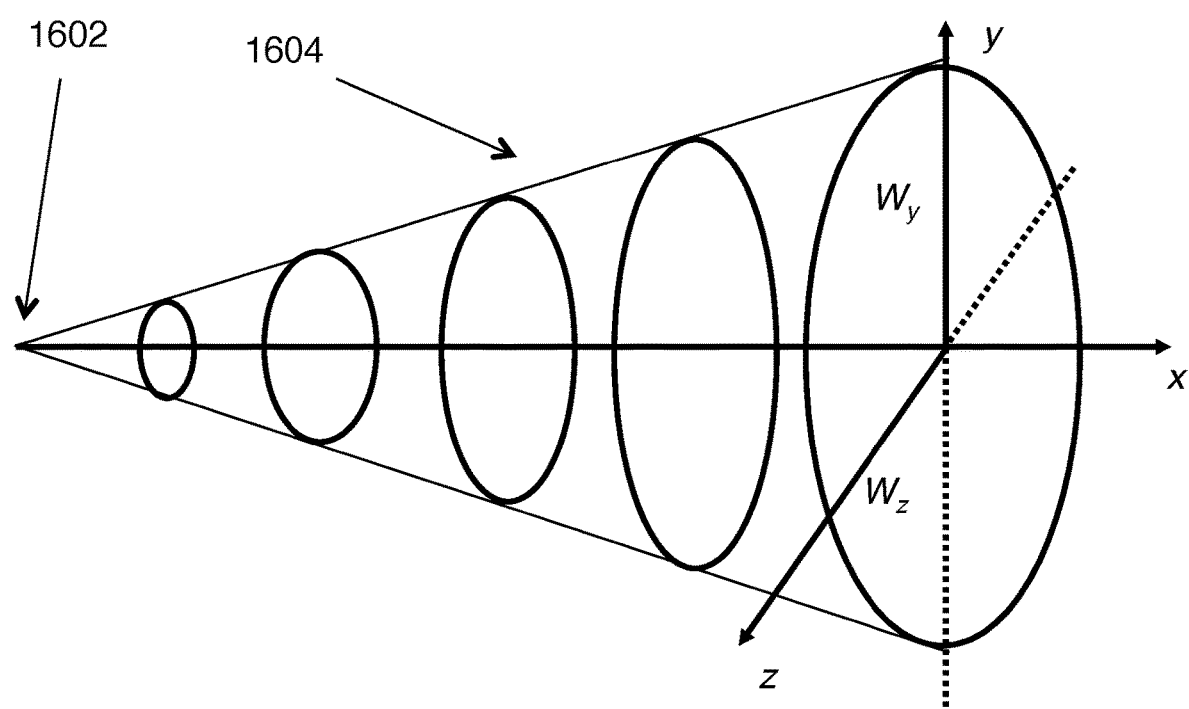
FIG. 16 schematically shows expansion of a gas plume as it propagates away from its source.

The vertical extent of the plume depends on the distance between the concentration measurement and the gas source as well as atmospheric conditions such as terrain, nearby structures, wind speed, and solar radiation. In a Gaussian plume model (Gifford, F. A., 1959. "Statistical properties of a fluctuating plume dispersion model". Adv. Geophys., 5, 117-137, hereby incorporated by reference in its entirety), the concentration C(x,y,z) from a ground-level source at a distance x downwind, z crosswind and height y may be written as $$C(x', y, z) = \frac{Q}{\pi v \sigma_y \sigma_z} e^{-\frac{y^2}{2\sigma_y^2} - \frac{z^2}{2\sigma_z^2}} \qquad (8)$$

where v is the wind speed, Q is the source strength, and $\sigma_{y,z}$ are the plume half widths, which increase as a function of distance from the source. FIG. 16 shows an example of this geometry, where 1802 is the source and 1804 is the plume.

Figure 17:
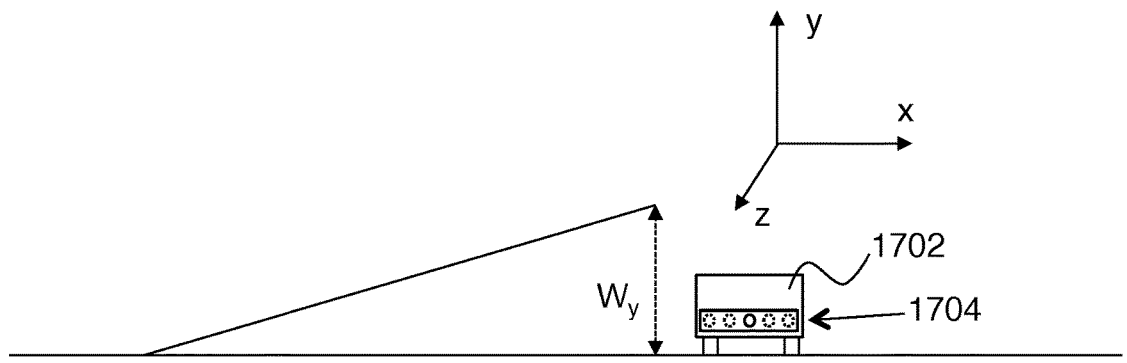
FIG. 17 is a front view of a vehicle passing through a gas plume.
Figure 18:
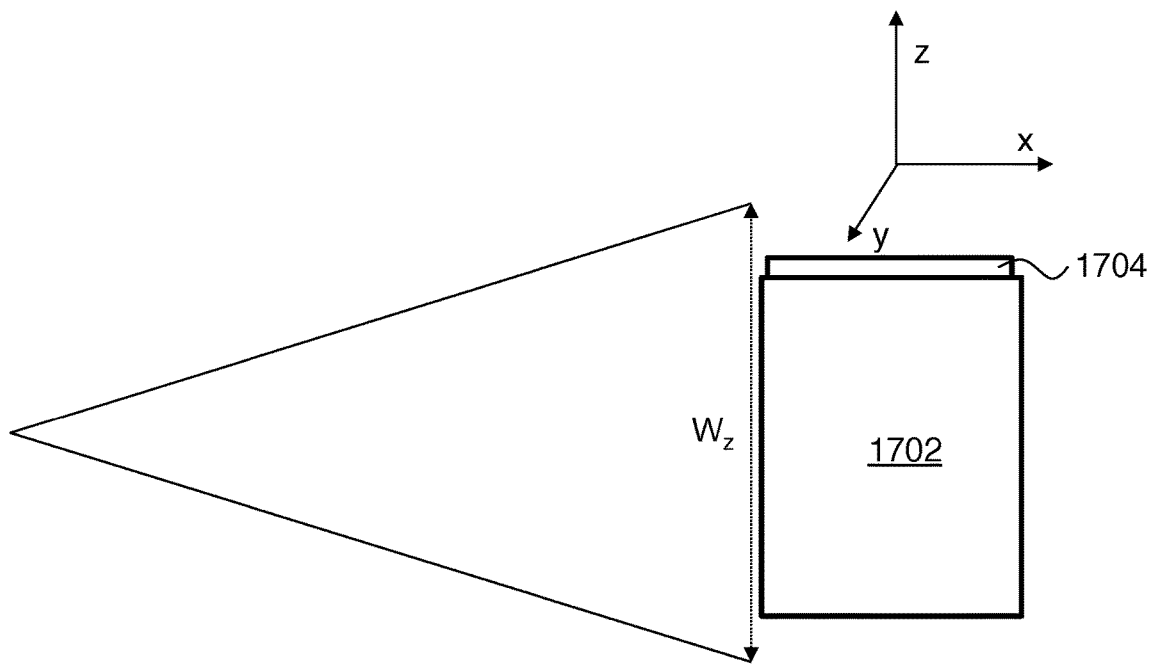
FIG. 18 is a top view of a vehicle passing through a gas plume.

This plume geometry is shown with respect to a mobile terrestrial platform on FIG. 17 (front view) and FIG. 18 (top view). Here 1702 is the mobile terrestrial platform and 1704 is measurement port (or 1-D array of measurement ports). It is apparent that the measurements will provide data for the horizontal plume extent $w_z$, and that an estimate of $w_y$ is needed to proceed with the flux estimate.

In the absence of a distance measurement, the plume half widths may be estimated using wind speed, time of day and solar radiation from the Pasquill-Gifford-Turner turbulence typing scheme (Turner, D. B. (1970). "Workbook of atmospheric dispersion estimates". US Department of Health, Education, and Welfare, National Center for Air Pollution Control, hereby incorporated by reference in its entirety).

Additionally, a geographic information system (GIS) may be used to inform a relevant distance scale. For example, the location of a leak on a natural gas pipeline is not usually more than 50 meters from a location on an adjacent road. Based on an idealized Gaussian dispersion model (Briggs, G. A. (1973). "Diffusion Estimation for Small Emissions". Air Resources Atmospheric Turbulence and Diffusion Laboratory, NOAA, Oak Ridge, Tenn., hereby incorporated reference in its entirety) the height of the gas plume at these distances will be between near ground level and up to about 10 meters depending on atmospheric stability.

In addition to the atmospheric stability and distance from the source, the vertical extent of the plume may also be impacted by local geography such as terrain and nearby structures. In a complex terrain with a large number of obstacles, turbulence is enhanced due to eddies that are setup up by air passing around or over structures. In fact, the presence of an obstacle tends to promote upward mixing (Hanna, S. R., Briggs, G. A., Hosker, R. P. Jr. (1982). *Handbook on atmospheric diffusion*. United States. doi: 10.2172/5591108, hereby incorporated by reference in its entirety). Therefore, in an area with many structures such as a city or dense suburban area, it is expected that plumes will be more mixed and have a larger vertical extent as opposed to a simple, flat terrain where plumes are more likely to follow an ideal dispersion model. These cases may be described categorically over different geographic areas with labels such as urban, suburban, rural, dense tree cover, sparse tree cover, etc., which may be obtained, for example, from a variety of publicly available GIS databases or satellite images.

One way to estimate the vertical extent of the gas plume would be to directly obtain $\sigma_y$ by combining the measurements from the on-board wind velocity (speed and direction) and concentration along the vehicle path. Areas of enhanced concentration may be found by analyzing the horizontal spatial scale of a gas plume using concentration vs. position data. For example, each peak found in the concentration vs. position data may be fit with a Gaussian function (chosen based on a Gaussian plume shape model) to estimate the width or spatial extent. An upper limit can be set to ensure the measured sources are attributed to leaks at spatial scales typical of natural gas pipeline distribution infrastructure (widths in the range of 1-50 meters), and not large areas of elevated methane or a slowly varying background concentration. Using the measured angle between the wind direction and vehicle path $\theta_w$, $\sigma_z$ may be found by projecting the wind vector onto the vehicle path, so that $$\sigma_z = \sigma_z \sin(\theta_w) \qquad (9)$$

where $\sigma_z$, is determined from the horizontal spatial scale analysis. With $\sigma_z$ known, $\sigma_y$, and therefore the vertical extent, may be estimated based on atmospheric stability and local geography using a Gaussian dispersion model (e.g., Briggs, G. A. (1973). "Diffusion Estimation for Small Emissions". Air Resources Atmospheric Turbulence and Diffusion Laboratory, NOAA, Oak Ridge, Tenn.).

If a somewhat larger uncertainty can be tolerated, another approach for realizing a measurement of the flux of molecules through a virtual plane is to estimate the average vertical scale of plumes in a local geography via a model based on one or more of the following: horizontal spatial scales from an ensemble of plume measurements, a GIS (Geospatial Information System) indicating the location of buried pipelines in relation to the path of the vehicle, atmospheric measurements made from the vehicle or from nearby fixed weather stations. In some cases, it may be more convenient represent the degree of atmospheric mixing as a single parameter, $\chi$, defined on the interval (0,1) ranging from ground-level plumes to very disperse, mixed plumes. The average height as a function of $\chi$ may be written, for example, as $H_{avg}(\chi) = A \cdot \chi^B$ where boundary conditions are set by the characteristic spatial scales derived from an idealized Gaussian plume dispersion model. Choosing a range of $\chi$ that represents ensemble of leak sources that applies to a local geographic area (terrain, obstructions, scale of pipeline distribution infrastructure, etc.) or set of weather conditions may then be used to directly estimate the average vertical extent of the gas plumes measured at the vehicle.

To summarize the preceding considerations, there are several ways to provide the required estimate of vertical plume extent.

1) The estimate of vertical plume extent can be predetermined: e.g., a predetermined value between 0.1 m and 10 m.

2) The estimate of vertical plume extent can include providing a plume dispersion model (e.g., a Gaussian plume dispersion model) and estimating a distance from the line scan to a gas leak source. The plume dispersion model can includes atmospheric parameters such as: atmospheric temperature, atmospheric pressure, wind speed, wind direction, time of day, atmospheric stability class and solar irradiance. The plume dispersion model can include one or more geospatial parameters such as: locations of buried natural gas pipelines, size of artificial structures in proximity to the line scan, location of artificial structures in proximity to the line scan, size of natural structures in proximity to the line scan, and location of natural structures in proximity to the line scan.

3) In cases where a plume dispersion model is provided, the estimate of vertical plume extent can include providing a relation between the vertical plume extent and the horizontal plume extent that depends on the plume dispersion model.

4) The estimate of vertical plume extent can be based on a predetermined relation between the vertical plume extent and the horizontal plume extent.

The invention claimed is:

1. A method for estimating a gas plume flux of a gas leak, the method comprising:
    collecting a line scan of local gas concentration measurement data, wherein the line scan is defined by a mobile terrestrial platform as the mobile terrestrial platform moves;
    wherein a y-direction is a vertical direction of the mobile terrestrial platform, wherein a z-direction is a direction of travel of the mobile terrestrial platform, and wherein an x-direction is perpendicular to the y-direction and to the z-direction, whereby the line scan is a function of z;
    wherein one or more measurement ports are disposed on the mobile terrestrial platform at the same vertical height;
    automatically determining whether or not a gas leak is present by z-direction spatial scale analysis of the line scan of local gas concentration measurement data;
    automatically determining a horizontal plume z-extent from the line scan of local gas concentration measurement data;
    automatically estimating a vertical plume y-extent without having y-dependent measurement data;
    automatically estimating an ambient flow velocity of the line scan;
    automatically estimating a gas plume flux using at least the horizontal plume z-extent, the vertical plume y-extent and the ambient flow velocity;
    providing the gas plume flux as an output.

2. The method of claim 1, wherein the measurement ports are configured as a 1-D array of measurement ports disposed along the x-direction and having their outputs combined for gas concentration analysis.

3. The method of claim 1, wherein the automatically estimating the vertical plume extent comprises providing a predetermined vertical plume extent, wherein the predetermined vertical plume extent is a predetermined value between 0.1 m and 10 m.

4. The method of claim 1, wherein the automatically estimating the vertical plume extent comprises providing a plume dispersion model and estimating a distance from the line scan to a gas leak source.

5. The method of claim 4, wherein the plume dispersion model includes one or more atmospheric parameters selected from the group consisting of: atmospheric temperature, atmospheric pressure, wind speed, wind direction, time of day, atmospheric stability class and solar irradiance.

6. The method of claim 4, wherein the plume dispersion model includes one or more geospatial parameters selected from the group consisting of: locations of buried natural gas pipelines, size of artificial structures in proximity to the line scan, location of artificial structures in proximity to the line scan, size of natural structures in proximity to the line scan, and location of natural structures in proximity to the line scan.

7. The method of claim 4, wherein the automatically estimating the vertical plume extent comprises providing a relation between the vertical plume extent and the horizontal plume extent that depends on the plume dispersion model.

8. The method of claim 4, wherein the plume dispersion model is a Gaussian plume dispersion model.

9. The method of claim 1, wherein the automatically estimating the vertical plume extent comprises providing a predetermined relation between the vertical plume extent and the horizontal plume extent.

10. The method of claim 1, wherein automatically estimating the ambient flow velocity of the line scan comprises obtaining weather station data.

11. The method of claim 1, wherein automatically estimating the ambient flow velocity of the line scan comprises obtaining wind speed and direction data from a sensor mounted on the mobile terrestrial platform.

* * * * *